United States Patent [19]
Holden et al.

[11] 3,946,483
[45] Mar. 30, 1976

[54] APPARATUS FOR AND METHOD OF REMOVING A FLEXIBLE TUBULAR CONDUIT FROM AROUND AN ASSOCIATED ELONGATED RIGID SUPPORTING MANDREL

[75] Inventors: Homer N. Holden, Sylva; James P. Hunt, Clyde; Vernon D. Browning, Waynesville; Edward L. Hoglen, Candler, all of N.C.; Donald L. Kleykamp, Springboro, Ohio

[73] Assignee: Dayco Corporation, Dayton, Ohio

[22] Filed: Mar. 5, 1975

[21] Appl. No.: 555,491

[52] U.S. Cl. .................. 29/427; 29/235; 29/240; 164/345; 425/436 R
[51] Int. Cl.² ........................................ B23P 19/02
[58] Field of Search ............ 29/427, 426, 433, 455, 29/200 R, 200 D, 200 I, 200 P, 203 P, 240, 240.5, 241, 256, 282, 235, 202.5; 214/1 P, 1 PB, DIG. 3; 425/436 R, 436 RM, 438; 164/344, 345

[56] References Cited
UNITED STATES PATENTS

| | | | |
|---|---|---|---|
| 1,961,261 | 6/1934 | Ukropina | 425/436 X |
| 2,298,266 | 10/1942 | Bachleda | 425/436 RM |
| 2,604,658 | 7/1952 | Broden | 29/235 X |
| 2,997,737 | 8/1961 | Boggs et al. | 425/436 R |
| 3,556,742 | 1/1971 | Benzing | 29/256 |
| 3,624,892 | 12/1971 | Monteiro | 29/235 |

*Primary Examiner*—C. W. Lanham
*Assistant Examiner*—James R. Duzan
*Attorney, Agent, or Firm*—Reuben Wolk

[57] ABSTRACT

An apparatus for and method of removing a flexible tubular conduit from around an associated elongated rigid supporting mandrel which is at least several feet in length is provided wherein the mandrel and its conduit is supported on a support structure whereupon the conduit and mandrel are relatively moved axially to remove the mandrel from within the conduit.

17 Claims, 11 Drawing Figures

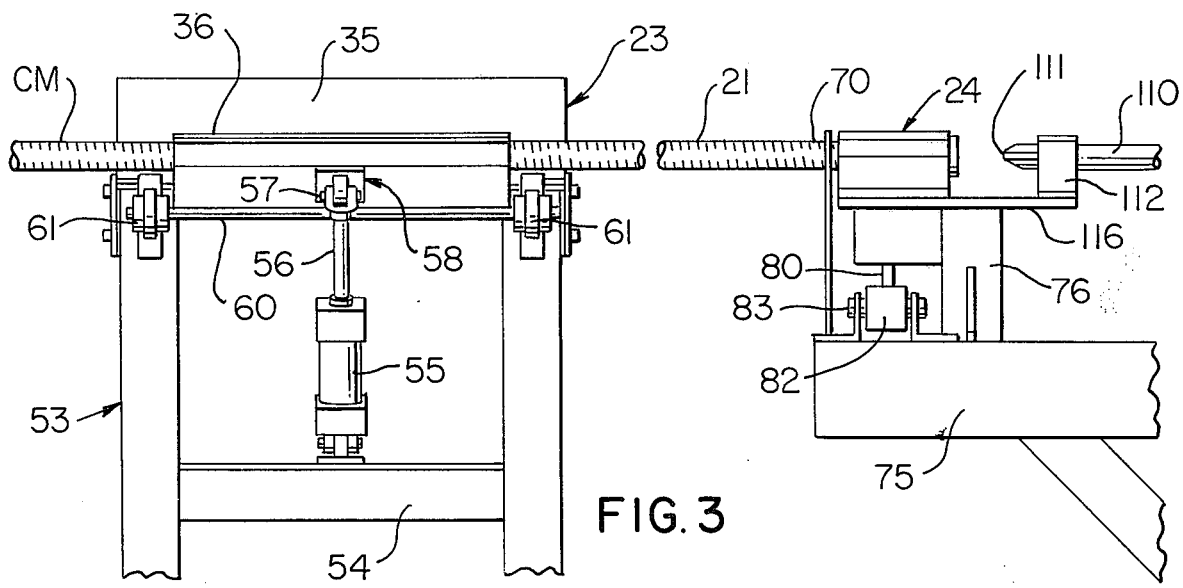
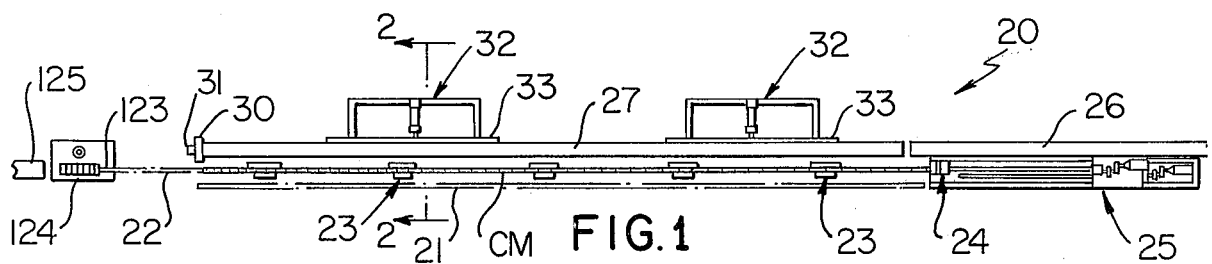
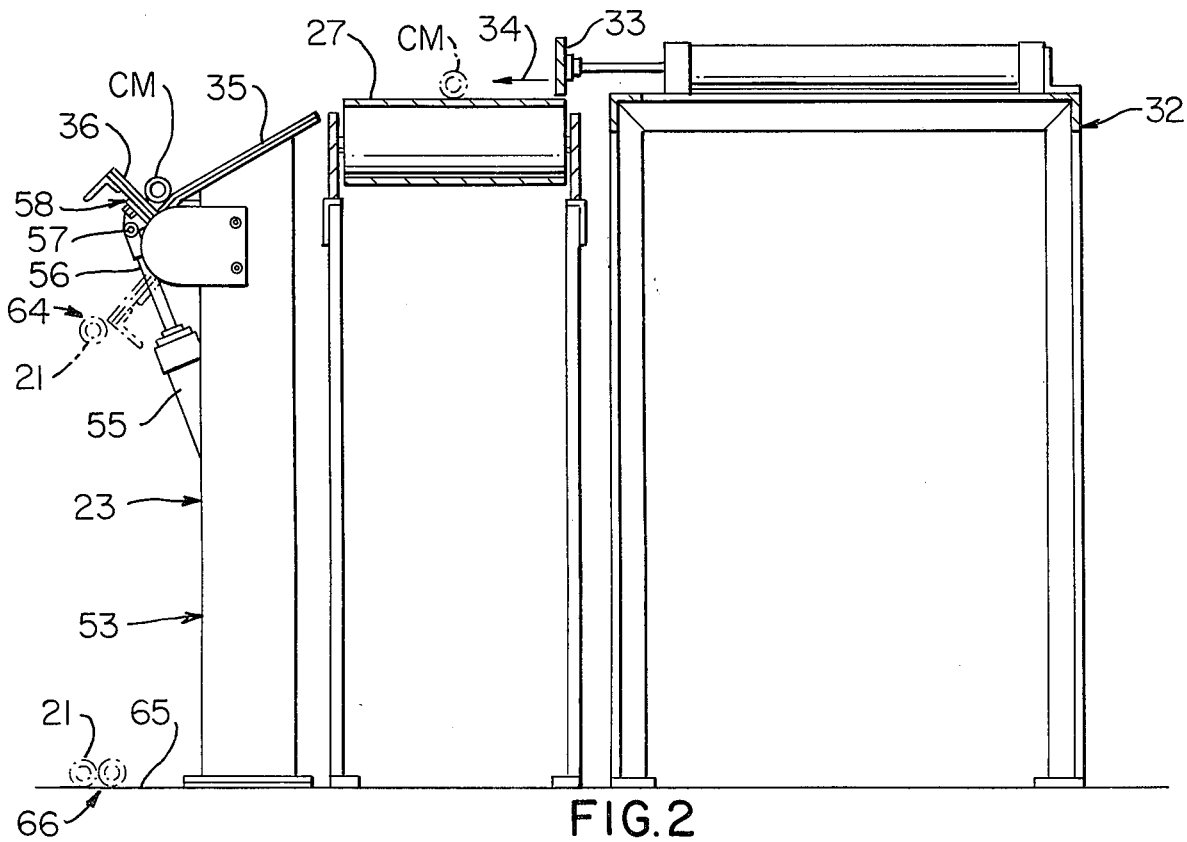

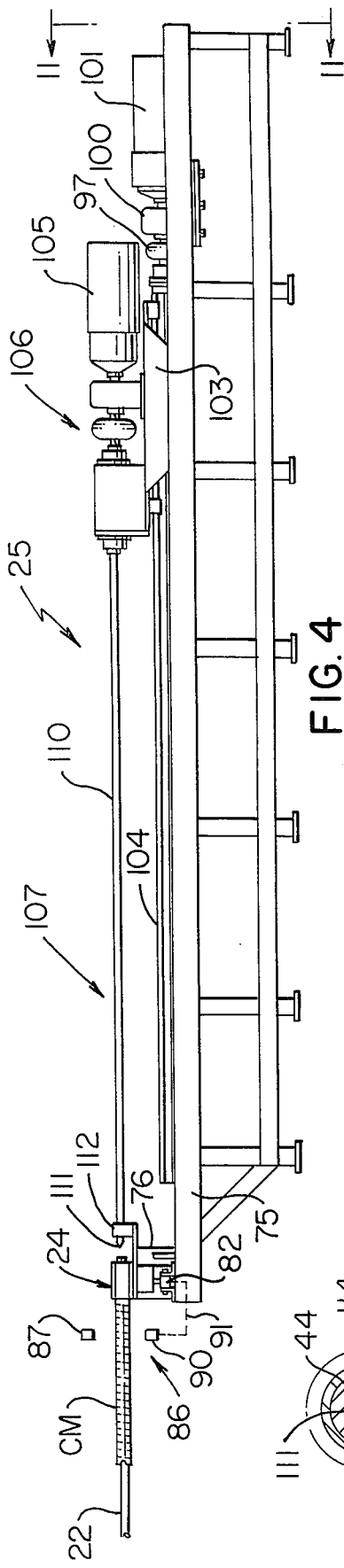
FIG. 4
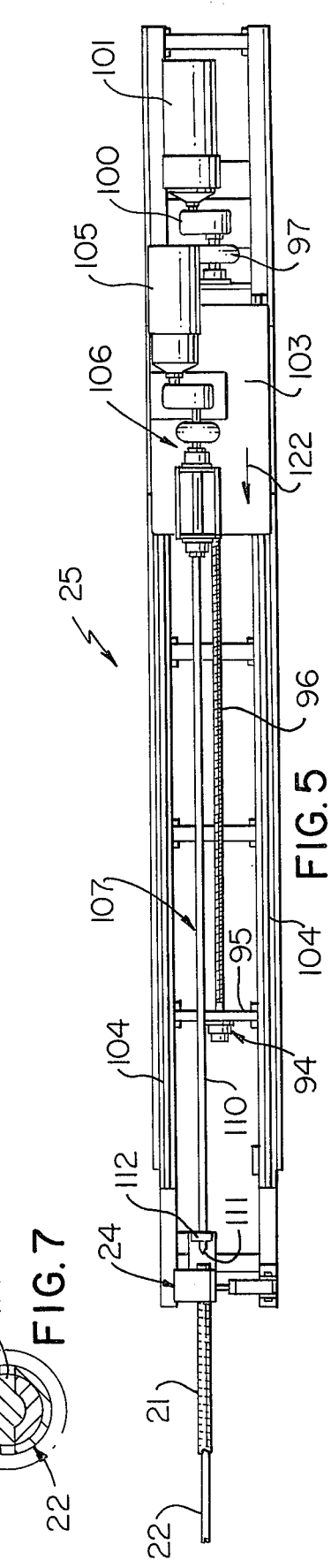
FIG. 5
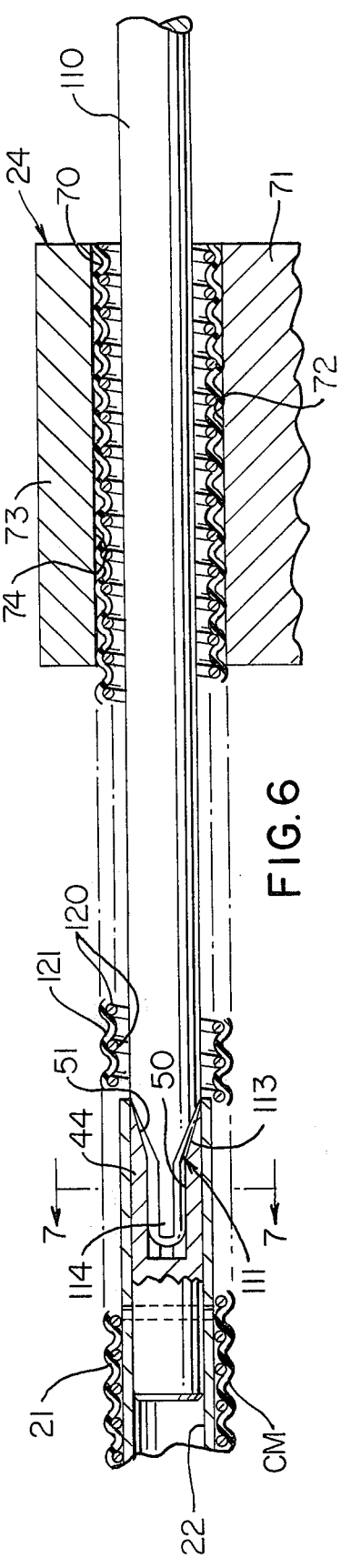
FIG. 6
FIG. 7

APPARATUS FOR AND METHOD OF REMOVING A FLEXIBLE TUBULAR CONDUIT FROM AROUND AN ASSOCIATED ELONGATED RIGID SUPPORTING MANDREL

CROSS REFERENCE TO RELATED APPLICATIONS

This application is related to applicants' copending application Ser. Nos. 555,492 and 555,493 filed on the same date as the present application.

BACKGROUND OF THE INVENTION

Flexible tubular conduits made primarily of elastomeric materials are in wide use throughout industry whereby numerous manufacturers are engaged in making and selling such conduits, resulting in a highly competitive industry.

It has been found that tubular conduits of this type are often used for vacuum cleaner hoses or conduits and a typical vacuum cleaner conduit has one or more reinforcing wires wound in a helical pattern along the length of the conduit and an elastomeric sleeve usually made of a plastic material is provided around the reinforcing wire or wires.

It is generally very difficult if not impossible to produce a high quality vacuum cleaner conduit (i.e., one with precisely controlled wall thickness and diameter) of the character mentioned without producing such a conduit on a rigid mandrel of substantial length, such as of at least several feet and preferably of the order of 50 feet and even more. However, in manufacturing such a conduit on a rigid mandrel of such a substantial length, it is ordinarily very difficult to remove the mandrel from within the flexible tubular conduit in a simple and efficient manner without damage to the conduit and its supporting mandrel.

SUMMARY

This invention provides a simple and efficient apparatus for and method of removing a precisely formed flexible tubular conduit from around an associated elongated rigid supporting mandrel which has a rigid outside surface and a substantial length without damage to the conduit and mandrel whereby the mandrel may be re-used.

The apparatus and method provide for supporting the conduit on a support structure whereupon the conduit and mandrel are relatively moved axially to remove the mandrel from within the conduit. In those instances wherein the flexible conduit has at least one integral helical reinforcing wire therealong, the mandrel is preferably rotated during relative movement in a direction opposite the direction that the reinforcing wire is wound causing some radial expansion of the conduit which enables the mandrel to be removed in an easier manner.

Other details, uses, and advantages of this invention will be readily apparent from the exemplary embodiments thereof presented in the following specification, claims, and drawings.

BRIEF DESCRIPTION OF THE DRAWINGS

The accompanying drawings show present exemplary embodiments of this invention, in which FIG. 1 is a plan view with parts broken away particularly illustrating one exemplary embodiment of the improved apparatus and method of this invention together with certain components of associated apparatus which enables serial movement of flexible conduit covered elongated rigid mandrels into position for stripping of the associated flexible conduit from around each rigid mandrel;

FIG. 2 is an enlarged end view taken essentially on the line 2—2 of FIG. 1 and showing, by solid lines, a flexible tubular conduit covered mandrel in a horizontal position on support structure of the apparatus of this invention, and showing by dotted lines the manner in which such conduit covered mandrel is supported on a conveyor for movement thereof onto the support structure as well as showing the stripped conduit being dropped onto a supporting floor.

FIG. 3 is a view with parts in elevation and parts broken away showing a component of the conduit covered mandrel support structure and a conduit clamp device of the apparatus of this invention;

FIG. 4 is a view in elevation of the apparatus and method of this invention with certain parts broken away and other components shown schematically;

FIG. 5 is a plan view of the main apparatus illustrated in FIG. 4 drawn to the same scale as in FIG. 4;

FIG. 6 is a view with parts in cross section, parts in elevation, and parts broken away particularly illustrating an end portion of a flexible conduit which is to be stripped being held by a clamp device in a stationary position and illustrating a rod used to rotate and push each mandrel relative to the held conduit to enable removal of the mandrel from within the conduit.

FIG. 7 is a cross-sectional view taken essentially on the line 7—7 of FIG. 6;

DETAILED DESCRIPTION

Figure 8:
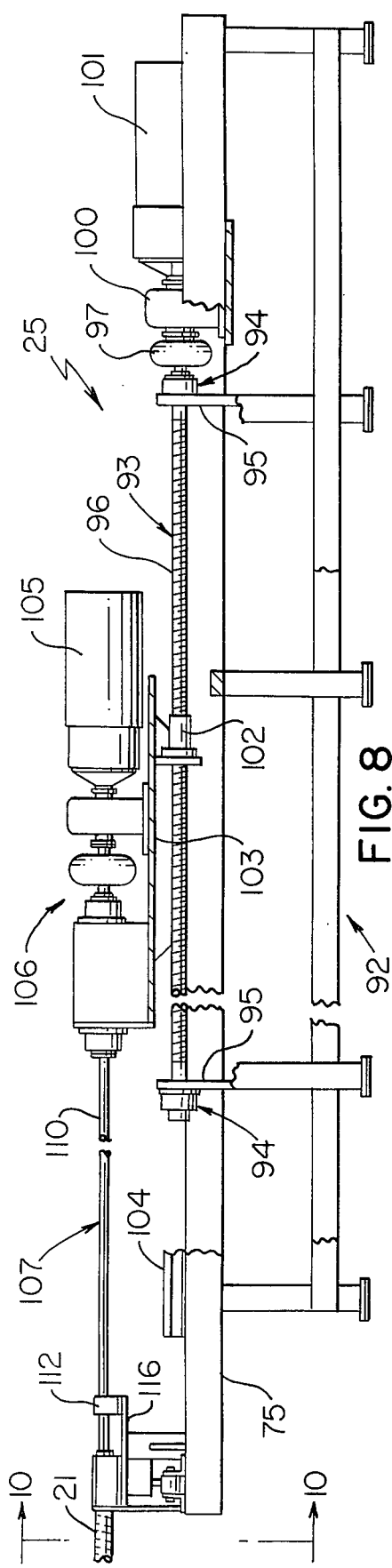
FIG. 8 is a view similar to FIG. 4 with certain parts broken away illustrating the position of a device used to rotate and push the mandrel assembly after a mandrel has been partially removed from within its associated conduit.

Reference is now made to FIG. 1 of the drawings which illustrates one exemplary embodiment of the apparatus and method of this invention which is designated generally by the reference numeral 20 and such apparatus and method is particularly adapted for removing a flexible tubular conduit 21, also see FIG. 6, from around an associated elongated rigid supporting mandrel 22 having a substantial length of at least several feet, ranging between 2 and 100 feet, and in this embodiment of the invention preferably having a length of 50 feet. The apparatus 20 has a support structure in the form of a plurality of rectilinearly aligned spaced supporting troughs or trough-like supports 23 for supporting each mandrel 22 with its conduit 21 therearound and such conduit covered mandrel will be referred to by the reference letters CM. The apparatus 20 has means for holding an end portion of the conduit and in this example such holding means is in the form of a clamp device or clamp 24 and the removing apparatus 20 has means or a device 25 for engaging and simultaneously rotating and pushing the mandrel relative to the clamp 24 to remove the mandrel 22 from within its conduit 21 and in a manner to be described in detail subsequently.

The apparatus 20 is used in connection with an overall system or apparatus which is used to produce elongated conduits in a continuous manner around mandrels 22 which are operatively associated in aligned end-to-end relation and as disclosed in the cross referenced application, Ser. No. 555,493, as disclosed in this application, the continuously formed conduit 21 is severed (using the apparatus disclosed in crossreferenced application Ser. No. 555,492) into lengths roughly equal to and being aligned with the ends of an associated mandrel to define what has been referred to above as a conduit covered mandrel CM shown on the apparatus 20 of this invention.

Each conduit covered mandrel CM is moved in position alongside the removing apparatus 20 by a plurality of cooperating aligned conveyors such as belt conveyors 26 and 27, and the conveyors 26 and 27 move the conduit covered mandrel CM until its forward end strikes a stop 30 which actuates an electrical limit switch which in turn energizes a pair of pusher assemblies each designated generally by the reference numeral 32. The pusher assemblies operate in unison and each has a conduit covered mandrel engaging component 33; and, the components 33 engage the conduit covered mandrel CM which has just been moved into position and push it across the conveyors 26 and 27 as indicated by the arrow at 34 in FIG. 22 onto a plurality of inclined slides 35 of the supports 23.

The conduit covered mandrel CM is moved under the influence of gravity along the slides 35 until it engages inclined movable plate members 36 of the supports 23 whereby the conduit covered mandrel CM is, in essence, cradled between cooperating components 35 and 36 which are arranged in a substantially V-shaped configuration. The supports 23 support the conduit covered mandrel CM in a substantially horizontal position and the detailed construction and operation of such supports will be described in more detail subsequently.

Figure 9:
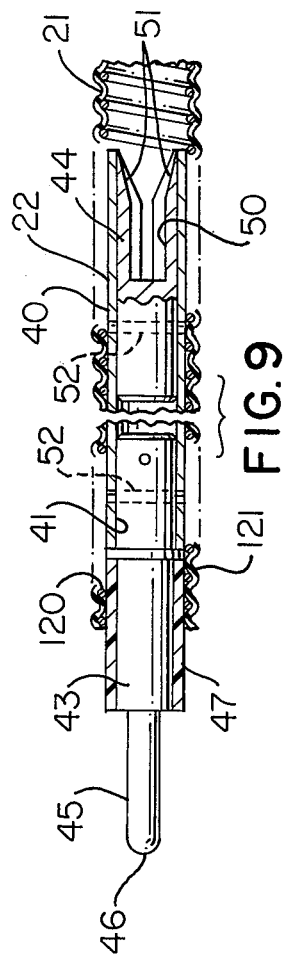
FIG. 9 is a view with parts in cross section, parts in elevation, and practically all of the central part broken away of an elongated rigid mandrel of this invention particularly illustrating the male and female connectors at opposite ends thereof and a flexible wire reinforced tubular conduit therearound.

Referring now to FIG. 9 of the drawings, each of the mandrels 22 is a substantially rigid mandrel and is made of a comparatively hard non-yielding material such as metal, hard plastic, or the like. The mandrel 22 is preferably in the form of a tubular mandrel which has a substantially right circular cylindrical outside surface 40 and a corresponding right circular cylindrical inside surface 41 and the tubular mandrel 22 is preferably made of ferrous metallic material, such as mild steel, for example.

Each mandrel 22 has connecting means at opposite ends thereof for connecting each end thereof to an associated tubular mandrel which is preferably of equal length. The connecting means comprises a pair of connectors at opposite ends thereof and are shown in the form of a male connector 43 and a female connector 44. The male connector 43 has a connecting pin 45 extending from its outer terminal end and such pin has a rounded substantially hemispherical end 46 enabling easy connection with an associated female connector 44; and, each male connector 43 also has a sleeve 47 made of a suitable elastomeric material which enables the connector 43 to serve as a backing anvil against which a cutter (not shown) may be urged in the process of severing the conduit 21 so that with a plurality of mandrels 22 connected in end-to-end relation the urging of the cutter against each male connector 43 which moves therepast results in each mandrel 22 having a length of conduit therearound substantially equal to its length.

Each female connector 44 has a substantially right circular cylindrical internal surface 50 for receiving an associated connecting pin 45 and also has a pair of inclined surfaces 51 which are particularly adapted to receive a cooperating portion of a component of the device 25 and for a purpose to be described in detail subsequently. The connectors 43 and 44 are suitably fixed within associated end portions of the tubular mandrel 22 and in this example each connector 43 and 44 is fixed by an associated pin 52 which extends through a diametral opening therethrough and through a pair of diametrically arranged aligned openings in the mandrel 22.

Referring now to FIGS. 1, 2, and 3 of the drawings, the support structure for supporting each conduit covered mandrel CM in a substantially horizontal position comprises the previously mentioned plurality of substantially rectilinearly aligned spaced supports 23. Each support 23 comprises a supporting frame which is designated generally by the reference numeral 53 and which has a horizontal beam 54 which supports one end of an actuator 55. The opposite end of the actuator 55 has an extensible and retractable rod 56 which has a terminal end connected by a pin 57 to a movable plate assembly 58 which has plate member 36 defining its conduit covered mandrel engaging component. The plate assembly 58 is supported for pivoting movement by a rod 60 which is suitably supported in bearings 61 at opposite ends thereof whereby the plate assembly 58 may be moved, i.e. pivoted, from a solid line supporting position to the dotted line position illustrated in FIG. 2 by energizing the actuator 55 causing retraction of the rod 56 and movement of the plate assembly to the illustrated dotted line position whereby the conduit 21 with its mandrel 22 removed from therewithin drops by gravity as illustrated at 64 onto a supporting floor 65 as illustrated at 66 where the conduit 21 and other conduits previously stripped or removed from their mandrels may be picked up and processed for various end applications.

Figure 10:
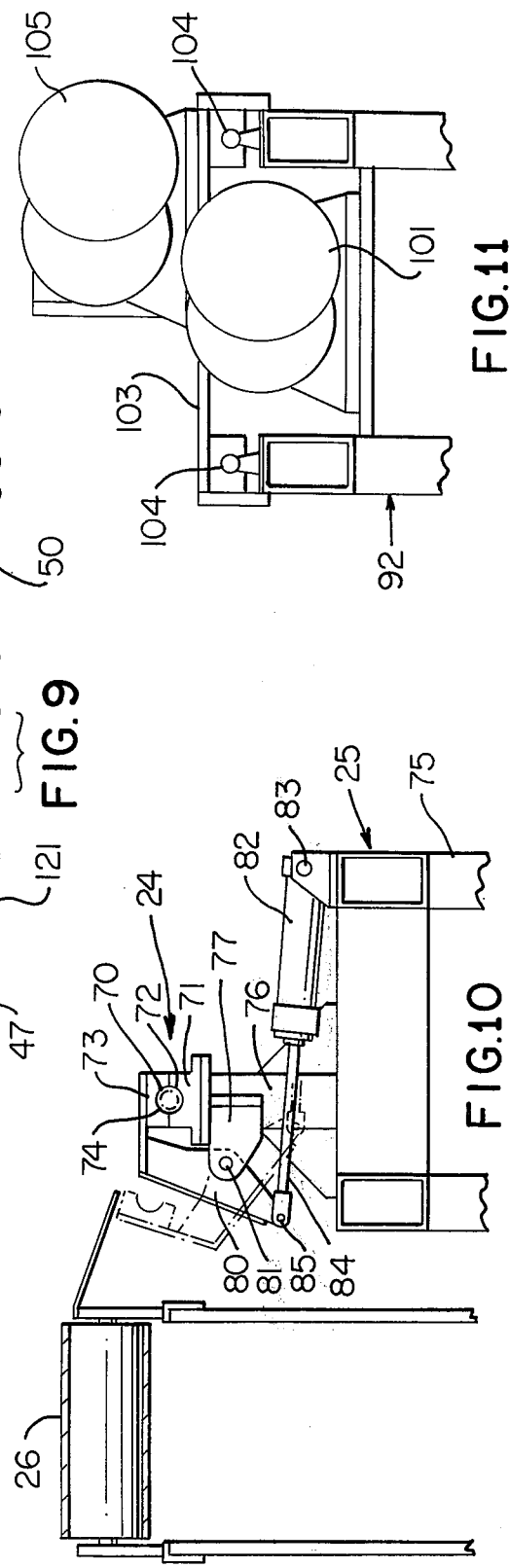
FIG. 10 is a view taken essentially on the line 10—10 of FIG. 8.
Figure 11:
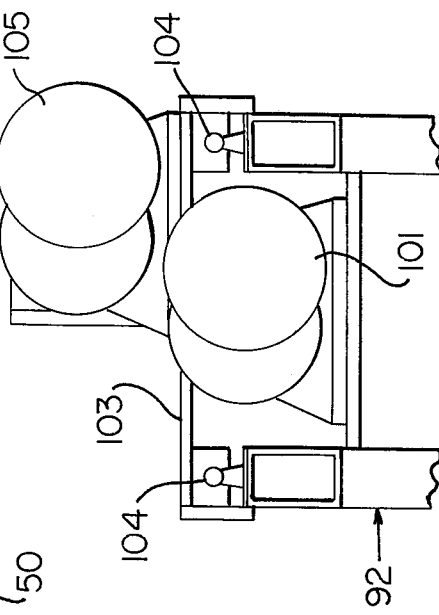
FIG. 11 is a view drawn to an enlarged scale and taken essentially on the line 11—11 of FIG. 4.

As mentioned earlier, the apparatus 20 has a clamp device or clamp 24, and, the clamp 24 is particularly adapted to engage a terminal end portion 70, see FIGS. 6, 8, and 10, of a conduit 21 which is to have its mandrel 22 removed from therewithin. The clamp 24 has a stationary portion 71 which is provided with a substantially semi-cylindrical clamping surface 72, and the clamp 24 has a movable portion 73 which is provided with a cooperating semi-cylindrical clamping surface 74. The portions 71 and 73 of clamp 24 are supported on a suitable supporting frame 75 as will now be described.

The supporting frame 75 has an upwardly extending columnar member 76 which is provided with a horizontally extending arm portion 77. A linkage 80 is provided which is pivoted about a pin 81 extending through the outer portion of the arm 77 and the linkage 80 is pivoted about the pin 81 by an actuator assembly 82 which has a rear portion supported by a pin 83 which allows pivoting movement of the actuator assembly 82 and such actuator assembly 82 has an extensible and retractable rod 84 which has a terminal end attached by a pin 85 to the linkage 80.

Once each conduit covered mandrel CM is pushed off of conveyors 26 and 27 it rolls by gravity along the slide members 35 and is cradled between members 35 and plate members 36 which support such conduit covered mandrel CM in a horizontal position with the end portion 70 of the conduit 21 on the surface 72 of the clamp 24. The horizontally supported covered mandrel CM interrupts the beam of a photoelectric device 86 which has the usual oppositely arranged cooperating components 87 and 90. Component 90 provides a signal through an electric lead 91 to actuate the actuator assembly 82. The actuator rod 84 of the assembly 82 is extended thereby pivoting the linkage 80 about pin 81 causing the clamping surface 74 to be clamped against the top surface portion of the end portion 70 of conduit 21. At this point in the operation of the apparatus 20 and as illustrated in FIG. 3, the conduit covered mandrel CM is supported substantially horizontally by the supports 23 and the clamp 24 has engaged and holds the trailing end portion 70 whereby the entire conduit 21 is held in a substantially stationary position in preparation for operation of the dual-function device 25 of the apparatus 20.

As best seen in FIG. 8 the device 25 comprises a supporting frame structure 92 which supports a ball screw assembly 93 comprised of oppositely arranged bearing assemblies or bearings 94 which are supported on vertically extending columnar supports 95 of the frame structure 92 and the bearings 94 enable free rotation of a screw 96 comprising the ball screw assembly 93. The ball screw mounting on supports 95 is such that the ball screw is spring loaded in one direction and thus subjected to tension loads only. The screw 96 is coupled by a suitable coupler 97 to the driving shaft of a gear box 100 which in turn is suitably operatively connected to a reversible driving motor 101 which is preferably an electric motor. Thus, upon rotating the motor 101 in one direction the screw 96 rotates in a corresponding direction and upon rotating the motor 101 in an opposite direction the screw 96 rotates in a corresponding reverse direction.

The ball screw 96 is of known conventional construction and design and has a so-called ball nut 102 also of a known construction suitably threaded thereon and the ball nut 102 is fixed to a carriage 103. The carriage 103 is supported for rectilinear back and forth horizontal movements by a pair of parallel horizontal ways 104, see FIG. 5.

The carriage 103 fixedly carries another motor 105 which is preferably electrically powered and the motor 105 is operatively connected by a coupling assembly 106 to a rod assembly designated generally by the reference numeral 107. The rod assembly includes a rod which has a wedge-like end portion 111 (which has the appearance of a regular screw-driver) and a bearing assembly 112; and, upon rotating the motor 105 the rod 110 and its end portion 111 is rotated in a corresponding manner.

The rod 110 is made of a suitable rigid material capable of transmitting both axial and torsional forces without buckling and minimum torsional deflection; and, it will be appreciated that the speed of rotation of the rod 110 is controlled by the speed rotation of the electric motor 105. Further, to assure that the rod 110 will rotate the mandrel 22 it will be seen that such rod has cooperating inclined surfaces 113 defining its terminal end 111, see FIG. 6. The end 111 also has what may be considered a tongue or projecting portion 114 and the portion 114 serves to guide the forward end of the rod 110 into position in the connector 44 whereby the inclined surfaces 113 serve to engage surfaces 51 of the connector 44 to rotate such connector and its mandrel 22.

The bearing assembly 112 operates such that it enables substantially anti-friction rotation and axial sliding movement of the rod 110 relative thereto. The bearing assembly 112 is suitably supported on a horizontal beam 116 fixed to the columnar support 76 so that the terminal end of the rod 110 is arranged in aligned relation with the clamping surfaces 72 and 74 of the clamp 24, and indeed the construction and arrangement of components is such that a common rectilinear center line extends horizontally through the central axis of the rod 110, the longitudinal axis of the conduit covered mandrel CM, and the axis of the substantially cylindrical surface defined by semi-cylindrical surfaces 72 and 74.

The flexible conduit 21 may be any suitable flexible conduit 21 known in the art. Preferably such conduit is in the form of a wire reinforced conduit 21 having at least one, and in this example a plurality of two, helically wound plastic sleeve insulated electrical wires 120 wound in a helical pattern along the length of the conduit. The conduit 21 includes a tubular outer member or tube portion 121 and the plastic sleeve of the wires 120 is bonded to tube portion 121 of the conduit 21, see FIG. 9.

Having described the detailed construction of the apparatus 20 of this invention, a brief presentation will now be made of the overall operation thereof. In particular, once a conduit covered mandrel CM is dropped on the supports 23 the clamp 24 is moved into clamping engagement with the trailing end portion 70 of the conduit 21. As the clamp 24 engages end portion 70, the device 25 is actuated causing rotation of the ball screw whereby the ball nut 102 and carriage 103 move along ways 104 toward the clamp 24 as indicated by the arrow at 122 in FIG. 5. The carriage 103 moves or slides the rod 110 axially through the bearing assembly 112 and when the portion 111 of rod 110 engages surface portions 51 of the female connector 44 the motor 105 is energized to start rotation of the rod 110 and rotation of the mandrel 22. However, although the mandrel 22 is rotating the clamp 24 holds the conduit 21 substantially stationary.

The conduit covered mandrel CM is supported and the conduit 21 thereof clamped so that the mandrel 22 is rotated in a direction opposite of the direction of rotation or winding of the helically wound wires 120 whereby this rotation in an opposite direction serves to utilize the helically wound electrical wires 120 themselves to help provide a slight radial expansion of the conduit 21 with such expansion being generally of the order of 1 to 3 thousandths of an inch. This slight radial expansion provides a substantial loosening of the mandrel 22 relative to the conduit 21 enabling it to be easily pushed axially relative to the conduit.

Simultaneously with the rotation of the rod 110, the motor 101 is also rotating and moving the entire carriage 103 relative to and toward the clamp 24 whereby the simultaneous rotation and axial movement of the rod 110 causes simultaneous rotation and axial movement of the mandrel 22 resulting in the mandrel being literally pushed and rotated from within its conduit 21. The rod 110 is rotated for a variable predetermined period after engagement of portion 111 within the slot comprised of surface portions 51. The motor 101 only operates while the conduit 21 is broken free from the mandrel over a portion of the mandrel length. The mandrel is pushed and rotated until its outer end emerges from the conduit and its terminal outer end 123, see FIG. 1, is grasped by a puller assembly 124 of a type well known in the art to pull such mandrel onto a conveyor 125 which moves the now stripped mandrel 22 to a transfer apparatus which moves the mandrel to a suitable storage and dispensing mechanism or device (not shown) for reuse, as desired. The puller assembly provides both axial movement and rotation of each mandrel 22. The mandrel rotation is at a rate of about 1 revolution or turn for every 3 or 4 feet of mandrel length.

The concept described above wherein an end portion 70 of the conduit 21 on a central supporting mandrel 22 is clamped and held fixed and the mandrel 22 rotated to produce a slight radial expansion generally of the order of a few thousandths may be readily understood from the following description. For example, if a conduit 21 without a mandrel 22 therewithin were to be considered and the conduit 21 visualized as having its end portion 70 clamped in the clamp 24 with the remainder thereof extending horizontally on the supports 23 and if the unclamped end of such conduit 21 were to be rotated in the direction of the helical wires 120 this would, in essence, tend to reduce the diameter of the helix and contract the hose radially. Similarly, rotation of the unclamped end of the conduit 21 in a direction opposite the direction of rotation or winding of the helical reinforcing wires would create a radial expansion of the conduit 21 thereby increasing its inside diameter whereby if such a radially expanded conduit were to have the mandrel 22 therein the increased inside diameter would facilitate removal of the mandrel 22 upon moving such mandrel 22 relative to its conduit 21. A similar effect is produced by rotating a mandrel which is within a conduit 21 in a direction opposite the direction of the helical winding of such conduit's reinforcing wires. Thus, at the beginning of the mandrel removing operation the inside surface of the conduit 21 is snugly against the mandrel; however, by rotating the mandrel in a direction opposite the direction of winding of the helically wound reinforcing wires 120 a similar effect is produced as that produced if the unclamped end of the conduit itself were to be grasped and thus rotated resulting in a radial expansion of the conduit 21. This radial expansion coupled with the pushing action of the rod 110 due to the movement of the carriage 103 results in simultaneous rotation and axial movement of the mandrel relative to the substantially stationary conduit 21 whereby the mandrel is pushed out of the end of the conduit which is remote from the clamp 24.

As the mandrel 22 emerges from the remote end it is picked up by the pulling device 124 as explained earlier and the device 124 continues a pulling movement simultaneously with the pushing of the mandrel 22 by the rod 110 until the carriage 103 moves the full length of the ball screw 96 and stops adjacent the terminal end thereof. The carriage is stopped by any suitable electrical switch device such as a photoelectric device, limit switch, or the like, stopping the motor 101. The movement of the mandrel 22 is continued by the pulling device 124 until the entire mandrel has been removed.

The switch device which stops the motor 101 also has suitable means therein which provides a suitable signal to the motor 101 to reverse its rotation and hence the rotation of the ball screw which causes the carriage 103 to be returned to its initial or starting position whereby the carriage 103 is returned adjacent the end of the ball screw 96 which is arranged closely adjacent the motor 101 and the motor 101 is stopped in preparation for removal of another conduit 21 from a conduit covered mandrel CM.

In this disclosure of the invention, the conduit 21 is shown as being comprised of a plurality of two electrical conductors or wires 120 which also serve as strengthening members for the conduit 21; and, each of the wires 120 has a plastic electrical insulating sleeve therearound. Further, the tube 121 has portions of its inside surface bonded against the plastic sleeves of the wires 120 to define a unitary conduit 21. However, it will be appreciated that the mandrel removing apparatus of this invention may be used to remove conduits having only one helical reinforcing wire 120 or more than two of such wires 120.

The concept of this invention wherein rigid mandrels ranging from about 2 feet to 100 feet in length may have a flexible conduit removed therefrom is fully applicable to flexible conduits 21 which do not have helically wound reinforcing wires or members. Accordingly, with a conduit which does not employ helically wound reinforcing members the mandrel 22 may be rotated simultaneously with pushing or the mandrel 22 may be removed from such a flexible conduit simply by engaging the conduit and the mandrel and relatively moving these two components axially in opposite directions.

If desired, the mandrel 22 may have its outside surface suitably coated or treated with an anti-friction material which serves as a slipping agent and allows the mandrel 22 to be more readily slid from within its conduit 21. Further, in some applications of this invention suitable means (not shown) may be provided for injecting air within each mandrel 22 with suitable openings being provided along the length of each mandrel so as to slightly expand each length of conduit 21 from around its mandrel 22 to facilitate its axial sliding movement.

In this disclosure of the invention it will be appreciated that various electrical devices, switches, controls, and the like, normally used for controlling the various components which have been described herein have not been illustrated and, the usual control consoles, sources of power, electrical connections, and the like have not been illustrated either. However, it is to be understood that these items as well as all required devices and components used therewith would be provided in accordance with techniques which are well known in the art.

In this disclosure of the invention it will be seen that a reinforced flexible tubular conduit 21 is shown and described as being made primarily of plastic. However, it will be appreciated that the conduit 21 and in particular the tube portion 121 thereof may be made of any suitable elastomeric material in the form of either a plastic material, or a rubber compound whether in the form of a natural rubber compound or a synthetic rubber compound. Further, the reinforcing wires 120 are in the form of metal electrical conductor wires capable of conducting electricity as well as serving as reinforcing wires and such wires have electrical insulating sleeves therearound which may be made of any suitable elastomeric material compatible with the material used to make the tube 121 and preferably such that the sleeve of such wires 120 may be easily bonded to the tube 121 to define an integral unitary structure or conduit 21.

It will also be appreciated that the flexible conduit 21 may have one or a plurality of reinforcing wires which are helically wound and provided without a sleeve therearound. Further, the flexible conduit 21 may be reinforced by any other suitable means well known in the art.

Reference has been made in this disclosure to the use of a pulling device or puller 124 for pulling each mandrel 22 as it emerges from its conduit 21. The puller 124 may be of any suitable known construction and in this example of the invention such puller has a plurality of pairs of canted rollers, or the like, which are urged against and engage opposed surfaces of the mandrel 22. The cooperating rollers rotate in opposite directions and cooperate once frictionally urged against the mandrel to pull and simultaneously rotate the mandrel 22 away from its clamped conduit 21 and onto the conveyor 125 in the manner previously described. A typical puller of this type is manufactured by the Gatto Machinery Development Corporation, 134 Rome Street, Farmingdale, New York, 11735 and sold under the designation CAT-A-PULLER Model No. 846.

The mandrel 22 is shown herein as being in the form of a tubular mandrel; however, it will be appreciated that such a mandrel need not necessarily be tubular but may be of a substantially solid cross-sectional configuration provided such a solid mandrel is also rigid and has a comparatively rigid outside surface similar to the rigid outside surface 40 of mandrel 22.

The apparatus and method of this invention have been described in connection with the removal of mandrels which are 50 feet long from within conduits 21 used in vacuum cleaner applications. However, it will be appreciated that the apparatus and method of this invention may be utilized to remove all types of substantially flexible conduits from around their associated elongated rigid supporting mandrels including conduits used as automobile radiator hoses as well as hoses used to convey all types of fluid.

Reference has been made in this disclosure to the removal of each mandrel 22 from its conduit 21 by simultaneous relative rotation and relative axial movement. The speed of relative rotation used is generally of the order of 120 revolutions per minute while the speed of relative axial movement is generally of the order of 60 feet per minute.

While present exemplary embodiments of this invention, and method of practicing the same, have been illustrated and described, it will be recognized that this invention may be otherwise variously embodied and practiced within the scope of the following claims.

What is claimed is:

1. A method for removing a flexible tubular conduit from around an elongated rigid supporting mandrel which is at least several feet long with said conduit having at least one integral helical reinforcing wire extending along the length thereof, said method comprising the steps of supporting said mandrel and its conduit on a support structure, holding an end portion of said conduit in a stationary position, and simultaneously rotating and moving said mandrel during holding of said conduit in said stationary position to remove said mandrel from within said conduit, said rotation of said mandrel being in a direction opposite the direction of rotation of said helical reinforcing wire causing radial expansion of said conduit relative to said mandrel enabling easier moving of said mandrel from within said conduit.

2. A method as set forth in claim 1 in which said supporting step comprises supporting said mandrel and its conduit substantially horizontally, said mandrel and conduit being at least several feet long.

3. A method as set forth in claim 2 in which said holding step comprises clamping said end portion of said conduit between semicylindrical surfaces of a clamp.

4. An apparatus for removing a flexible tubular conduit from around an elongated rigid supporting mandrel which is at least several feet long with said conduit having at least one integral helical reinforcing wire extending along the length thereof, said apparatus comprising, a support structure for said mandrel and its conduit, means for holding an end portion of said conduit in a stationary position, and means for simultaneously rotating and moving said mandrel relative to said holding means during holding of said conduit by said holding means to remove said mandrel from within said conduit, said means for rotating and moving operating to rotate said mandrel in a direction opposite the direction of rotation of said helical reinforcing wire causing radial expansion of said conduit relative to said mandrel enabling easier moving of said mandrel relative to said holding means.

5. An apparatus as set forth in claim 4 in which said support structure comprises a plurality of elongated trough-like supports which are arranged in spaced rectilinearly aligned relation and are adapted to support said mandrel and its conduit substantially horizontally.

6. An apparatus as set forth in claim 5 in which each of said elongated trough-like structures has an inclined slide member supported in a stationary position and a plate assembly which is adapted to be moved toward said slide member to define a V-shaped structure for supporting the mandrel and its conduit, said plate assembly being adapted to be moved away from said slide member to allow said conduit to drop away therefrom after removal of its mandrel.

7. An apparatus as set forth in claim 6 and further comprising means for moving said plate assembly toward and away from said slide member.

8. An apparatus as set forth in claim 7 in which said means for moving said plate assembly comprises an actuator assembly having an extensible and retractable rod.

9. An apparatus as set forth in claim 4 in which said means for holding an end portion of said conduit in a stationary position comprises a clamp device.

10. An apparatus as set forth in claim 9 in which said clamp device comprises a stationary portion having a substantially semicylindrical clamping surface and a movable portion which has a cooperating semicylindrical clamping surface.

11. An apparatus as set forth in claim 10 in which said movable portion and its semicylindrical surface is moved into clamping engagement by a linkage which is pivoted about a fixed pin.

12. An apparatus as set forth in claim 11 and further comprising an actuator for pivoting said linkage and said movable portion about said fixed pin.

13. An apparatus as set forth in claim 4 in which said means for simultaneously rotating and moving said mandrel comprises a dual-purpose device having a rotatable rod provided with a terminal end which is particularly adapted to engage a pair of inclined surfaces of a connector fixed on said mandrel to enable rotation of said mandrel.

14. An apparatus as set forth in claim 13 in which said device comprises a pair of fixed parallel ways, a carriage which is movable along said ways, and a drive for rotating said rod.

15. An apparatus as set forth in claim 14 in which said device further comprises means for moving said carriage and said rod with its drive along said ways.

16. An apparatus as set forth in claim 15 in which said means for moving said carriage and said rod with its drive along said ways comprises a ball screw and a cooperating ball nut fixed to said carriage and threadedly received around said ball screw such that upon rotating said screw in one direction said ball nut and carriage is moved in a corresponding direction and upon reversing the direction of rotation of said screw said ball nut and carriage are moved in an opposite direction.

17. An apparatus as set forth in claim 16 in which said means for moving said carriage and said rod with its drive along said ways comprises a reversible electric motor operatively connected to said ball screw.

* * * * *